United States Patent [19]

Haering et al.

[11] 4,224,390
[45] Sep. 23, 1980

[54] LITHIUM MOLYBDENUM DISULPHIDE BATTERY CATHODE

[76] Inventors: Rudolph R. Haering, 647 Croydon Pl.; James A. R. Stiles, 4133 Fairway Pl., both of North Vancouver; Klaus Brandt, #318 - 1741West 10th Ave., Vancouver, all of Canada

[21] Appl. No.: 71,395

[22] Filed: Aug. 30, 1979

Related U.S. Application Data

[63] Continuation-in-part of Ser. No. 935,385, Aug. 21, 1978.

[51] Int. Cl.$^2$ ............................................. H01M 6/14
[52] U.S. Cl. .................................. 429/194; 429/218
[58] Field of Search ................ 429/194, 218, 103, 104

[56] References Cited

U.S. PATENT DOCUMENTS

| | | | |
|---|---|---|---|
| 2,148,453 | 2/1939 | Fruth | 201/70 |
| 2,239,414 | 4/1941 | Eddison | 91/70 |
| 2,515,788 | 7/1950 | Morrill | 148/4 |
| 2,819,962 | 1/1958 | Salouze | 75/208 |
| 2,905,574 | 9/1959 | Spengler et al. | 117/65 |
| 3,041,388 | 6/1962 | Fukuda et al. | 136/24 |
| 3,047,419 | 7/1962 | Yutema et al. | 117/46 |
| 3,096,567 | 7/1963 | Ross et al. | 29/155.5 |
| 3,249,459 | 5/1966 | Arnold et al. | 117/46 |
| 3,475,161 | 10/1969 | Ramirez | 117/46 |
| 3,749,603 | 7/1973 | Stringhan et al. | 136/6 |
| 3,791,867 | 2/1974 | Broadhead | 136/6 R |
| 3,864,167 | 2/1975 | Broadhead et al. | 136/6 LN |
| 3,915,740 | 10/1975 | Eisenberg | 136/6 LN |
| 3,925,098 | 12/1975 | Saunders | 136/6 LF |
| 3,956,194 | 5/1976 | Armand | 252/507 |
| 3,988,164 | 10/1976 | Liang et al. | 429/218 X |
| 4,000,006 | 12/1976 | Trocciola et al. | 427/115 |
| 4,002,492 | 1/1977 | Rao | 429/194 |
| 4,009,052 | 2/1977 | Whittingham | 429/191 |
| 4,011,372 | 3/1977 | Tomczuk | 429/218 |
| 4,041,220 | 8/1977 | Armand | 429/191 |
| 4,049,879 | 9/1977 | Thompson et al. | 429/191 |
| 4,049,887 | 9/1977 | Whittingham | 429/112 |
| 4,091,191 | 5/1978 | Gaines | 429/194 |

FOREIGN PATENT DOCUMENTS 819672 3/1975 Belgium.
1021844 11/1977 Canada.

OTHER PUBLICATIONS

Electrical Energy Stor. & Intercal. Chem., Whittingham, Sci., Jun. '76.
Supercond. in Intercal. Molybdenum Disulphid, Somoano et al., A.I.P. Conf. Supuconf. in d & f band metals, p. 273, 1972.
Intercal. Comp. of Lewis Bases and Layered Sulphides, Gamble et al., Sci., vol. 174, Oct. 1971.
Defined Intercal. Stages from Cathodic Red. of MoS$_2$ in Org. Elect. Besenhard et al.
Rever, Pop. Redox., React. of Layered Dichalcogenides, Schallhorn et al., Mat. Res. Bull., vol. 10, p. 1005, 1975.
Cryst. Chem. of Metal Dioxides with Rutile-Related Strut., Rogers et al., Inorg. Chem., vol. 8, No. 4, Apr. 1969.
Effect of Or., Comp. of Elech. Factors in Reduct. of O$_2$, Horhans J. Elec. Soc., vol. 124, p. 1196, 1977.
An Invest. of the Electrochem. of a Series of Metal Dioxides, Horhans et al., J. Electro. Soc., vol. 124, No. 8, p. 1202, Aug. 1977.
Top. React. of Rutile Related Struct. with Lithium, Murphy et al., Mat. Res. Bull., vol. 13, p. 1395, 1978.
High Ener. Den. Battery Based on Lithium Anodes, Di Pietro et al., Pow. Sources, vol. VI, p. 527, 1977.
Molybdenum Disulphide in the Poorly Cryst. "Rag" Struct., Chianelli et al., Sci., vol. 203, pp. 1105–1107, 16 Mar. 1979.
Low-Temp. Soln. Prep. of Group 4B, 5B, and 6B Trans. Metal Dichloride, Chianelli et al., Inorg. Chem., vol. 17, No. 10, pp. 2758-2762, Mar. 1978.

Primary Examiner—Charles F. LeFevour

[57] ABSTRACT

A cathode material for use in lithium batteries which exhibits several distinct phases of operation. Cathode potential may be reversibly cycled in each phase. Phase changes occur at constant potential as concentration of lithium in the cathode material varies.

15 Claims, 1 Drawing Figure

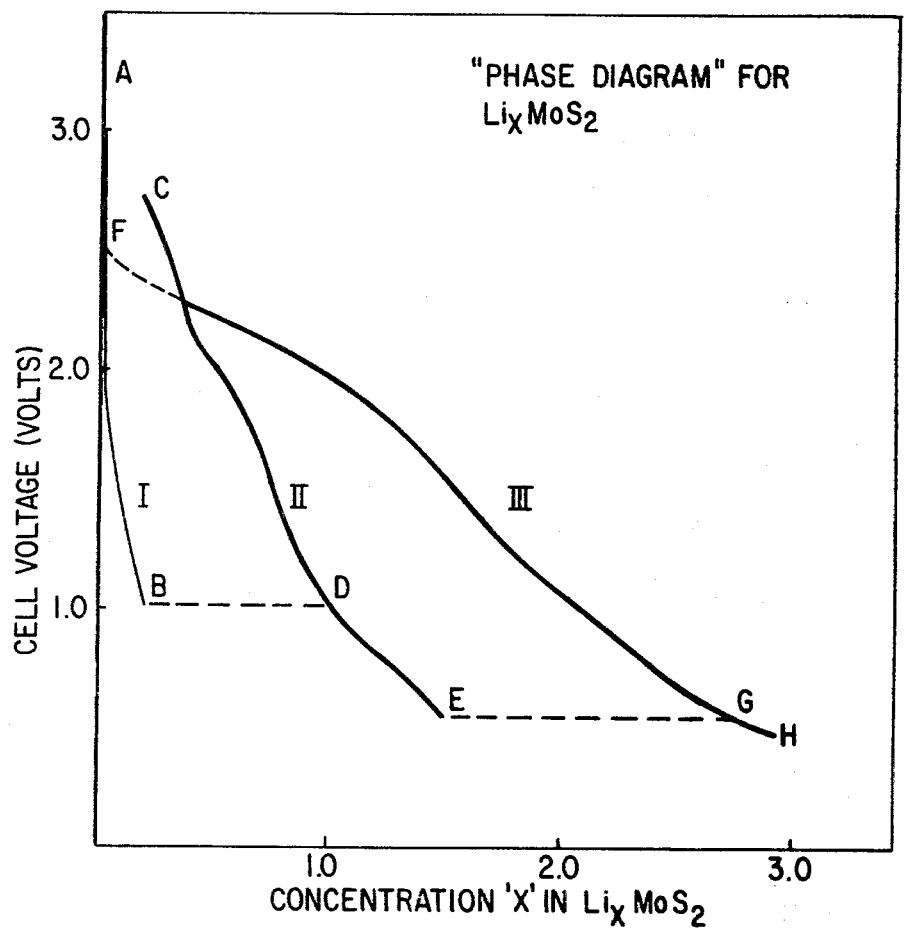

LITHIUM MOLYBDENUM DISULPHIDE BATTERY CATHODE

This application is a continuation-in-part of U.S. application Ser. No. 935,385 filed Aug. 21, 1978.

BACKGROUND OF THE INVENTION

This invention relates to storage cells ("Batteries") and specifically to a material for use as a secondary cell cathode. It is an object of the invention to provide a material which, when incorporated as cathode in a secondary cell, will allow a high degree of reversibility as the cell is repeatedly charged and discharged. It is another object of the invention to provide a relatively inexpensive material that is easily prepared for use as a cell cathode.

SUMMARY OF THE INVENTION

The inventors have discovered that a lithium molybdenum disulphide ($Li_xMoS_2$) compound exhibits several distinct stages ("phases") of operation when used as a cathode in a battery having a lithium anode.

During discharge of a newly constructed battery, (termed "phase 1" operation by the inventors) lithium cations intercalate into the cathode thus raising the concentration of lithium in the cathode. The inventors have found that battery voltage decreases during battery discharge to a particular point at which a plateau is reached. The plateau represents a region in which battery voltage remains constant while the concentration of lithium in the cathode continues to increase. Once a particular concentration of lithium in the cathode is achieved, the battery will continue to discharge in what the inventors have termed the "phase 2" region. In the phase 2 region, the battery potential may be reversibly increased or decreased within certain limits as the concentration of lithium in the cathode correspondingly decreases or increases. The phase 2 region overlaps the plateau on which the phase 1 to phase 2 transition occurs in that cathode concentrations of lithium are observed in phase 2 equal to those observed during the transition from phase 1 to phase 2, but at voltages higher than that at which the transition occurred. The transition between phase 1 and phase 2 does not appear to be reversible along the plateau. Phase 2 is a preferred phase of operation because of the excellent reversibility observed in batteries constructed with cathodes which have been conditioned to operate in phase 2. As is discussed in more detail hereinafter, while the initial discharge into phase 2 may be done at room temperature (e.g. about 20° C.) if the conversion is done relatively quickly it is generally preferred (and, in the case of relatively thick cathodes, may become necessary) to have a lower temperature (e.g. 0° C.).

If the potential of a battery which is operating in phase 2 is allowed to decrease to a particular level, a second plateau is reached along which cathode concentration of lithium increases at constant battery potential until a third phase ("phase 3") is reached in which battery potential may again be reversibly varied as cathode concentration of lithium increases and decreases. In phase 3 operation, the cathode concentration of lithium may be decreased to overlap values of cathode lithium concentration found in phase 2 and in the plateau along which the phase 2 to phase 3 transition occurs. A battery operating in phase 3 does not appear to be as highly reversible as a battery in phase 2, and tends to lose capacity more rapidly on repeated charge-discharge cycling. However, in some applications phase 3 operation may be considered preferable to phase 2 operation because energy density in phase 3 is considerably higher. Herein, and in the claims, the term "reversible" is used on the understanding that it does not mean perfect or 100% reversibility.

BRIEF DESCRIPTION OF THE DRAWING

The FIGURE is a graph showing representative characteristics of a battery having a cathode prepared by coating molybdenum disulphide ($MoS_2$) onto an aluminum foil substrate, a lithium foil anode and a 1 M $LiClO_4$ in propylene carbonate electrolyte. Battery voltage (measured in volts) is plotted as the ordinate vs. an abscissa "x" where "x" represents the concentration of lithium in the cell cathode having the general formula $Li_xMoS_2$.

DESCRIPTION OF THE PREFERRED EMBODIMENT

The FIGURE shows typical characteristics of a battery prepared with a lithium anode and a cathode constructed by coating molybdenum disulphide ($MoS_2$) onto an aluminum foil substrate. The quantity x represents the concentration of lithium in the cathode which increases as lithium cations intercalate into the cathode during battery discharge. As will become more clearly apparent hereinafter, while the FIGURE is typical, it is to be understood that the characteristics shown may vary somewhat in actual practice depending upon various parameters.

The battery is shown to discharge from an initial voltage of above 3 volts along path AB (3.3 volts is generally typical). Along this path, lithium cations intercalate into the cathode as battery potential decreases, thus increasing the concentration of lithium in the cathode as indicated. Path AB shows voltage decreasing from the initial value of about 3.3 volts to a plateau (path BD) while x correspondingly increases from 0 to about 0.2. This has been found typical at room temperature. However, at low temperatures (e.g., 0° C.), path AB has been found to become much steeper than illustrated with point B lying at a point where x is only slightly greater than 0. In some cases, point B has been observed to lie as high as about $x=0.5$ on a room temperature discharge. However, it is speculated that some electrolyte decomposition may have occurred on the discharge, or that some impurity may have been present. The inventors have termed as "phase 1" the physical structure of a cathode which exhibits a variation of battery potential with cathode lithium concentration governed by the path AB where point B lies in the range of x slightly greater than 0 to $x \approx 0.5$.

If the potential of a battery which is operating in phase 1 is allowed to decrease along path AB, then a plateau represented by path BD in the FIGURE is reached. The plateau is shown at about 1.0 volt —in practice it will typically fall in the range of about 0.9 to about 1.1 volts at room temperature, but may go as low as about 0.7 volts at very low temperatures. Although the plateau is shown as beginning at $x \approx 0.2$, it is to be understood on the basis of the immediately preceding discussion that in practice it may begin in the region of x only slightly greater than 0 to about $x=0.5$. The plateau path BD is shown in the FIGURE as ending at a point about where $x=1.0$. In practice, this end point has been observed to occur as high as about $x=1.5$. The reason for such variation is not clear, but may be attributable to unknown impurities in the cathode. The plateau path BD shown in the FIGURE indicates a region in which the battery operates at a relatively constant potential of about 1.0 volts while the concentration of lithium in the cathode represented by x increases during battery discharge.

As shown in the FIGURE, if a battery operating on the plateau path BD is allowed to continue to discharge, then once a cathode lithium concentrtion represented by a value of about $x=1.0$ has been achieved, the battery is observed to discharge along path DE. The battery discharge may be halted at any point along path DE and the battery may then be substantially reversibly recharged along path EC. The inventors have termed the physical structure of a cathode which exhibits a variation of battery potential with cathode lithium concentration goverened by the path CE shown in the FIGURE to be "phase 2" and describe the process of reversibly charging and discharging the battery along path CE as "phase 2 operation". Once phase 2 operation has been achieved, the battery will not re-enter the BD plateau directly from phase 2.

However, again it is to be noted that while the FIGURE is representative, variations are observed in practice. As shown, path DE depicts voltage decreasing from an initial value of about 1.0 volts to about 0.55 volts while the value of x increases from about 1 to about 1.5. Similarly, path CE depicts voltage decreasing from about 2.7 volts to about 0.55 volts as x increases from about 0.2 to about 1.5. In practice, for given voltages the observed value of x has been somewhat variable. For example, point C (voltage about 2.7 volts) may range from about a point where x is only slightly greater than 0 (at low temperatures) to about $x=0.5$. Point D (voltage about 1.0 volt) may range from about $x=1.0$ to about $x=1.6$. Point E (voltage about 0.55 volts) may range from about $x=1.3$ to about $x=2.0$. However, in all cases path CE maintains a slope generally downwardly to the right. The reason for such variations is not clear, but again may be attributable to unknown impurities in the cathode. Also, it is to be noted that such observations are at room temperature. At lower tempertures, measured voltages for a given value of x will tend to be somewhat lower. The 0.55 volts voltage depicted in the FIGURE for point E (and path EG discussed hereinafter) is typical at room temperature but generally may range from about 0.4 volts to about 0.6 volts.

The inventors have observed the most reliably reversible battery operation to occur in a battery having a cathode which has been conditioned to operate in phase 2, and have further observed the most reliably reversible phase 2 operation to occur along path CD. It has been found that if a battery which is operating in phase 2 is discharged along path CE reversibility degrades as battery potential drops below about 1 volt. Because batttery reversibility in phase 2 degrades as the battery is discharged below approximately 1 volt, the inventors recommend that phase 2 operations be confined to path CD by monitoring battery voltage to prevent recharging above a battery potential of about 2.7 volts and by preventing battery discharge below about 1 volt.

If the potential of a battery having a phase 2 cathode is allowed to decrease along path CE to approximately 0.55 volts (this voltage being typical as noted above), then a second plateau represented by the path EG is reached (at a cathode lithium concentration of about $x=1.5$ in the representative FIGURE shown) along which a transition from phase 2 to a third phase occurs at a relatively constant potential while the concentration of lithium in the cathode represented by x increases to about $x=2.8$. It is preferable to maintain the value of x equal to or below approximately 3 in practicing the present invention.

If a battery which is operating on the EG plateau is allowed to continue to discharge, then once a cathode lithium concentration represented by a value of about $x=2.8$ has been achieved, the cell is observed to discharge further along path GH. The cell discharge may be halted at any point along the path. The battery may then be recharged along path HF. The inventors have termed the physical structure of a cathode which exhibits a variation of battery potential with cathode lithium concentration governed by the path FH shown in the FIGURE "phase 3" and describe the process of reversibly charging and discharging the battery along path FH as "phase 3operation". Once phase 3 operation has been achieved, the battery will not re-enter the EG plateau directly from phase 3.

Point H in the FIGURE does not represent the lower limit of battery discharge capability. However, the inventors have observed a significant degradation in the performance of a battery which is discharged in phase 3 below about 0.3 volts. This degradation is thought to be related to a diffusion of lithium ions into the cathode aluminum substrate resulting in the formation of a lithium-aluminum alloy.

The inventors believe phase 3 operation not to be as reliably reversible as phase 2 operation. Further, the inventors have not been able to achieve battery potentials in phase 3 as high as those achieved in phase 1 or phase 2 operation of the battery. However, as indicated previously, this does not mean that phase 3 operation is invariably undesirable. The energy density of a battery in phase 3 is considerably higher than the energy density of a battery in phase 2. Thus, it is contemplated that in some applications where energy density requirements are subservient to improved reversibility and voltage characteristics, phase 3 operation may be selected as more desirable than phase 2 operation.

The inventors have found that if a battery operating in phase 3 is slowly recharged, then a transition from phase 3 to phase 2 will occur when a battery potential of about 2.3 volts is achieved.

The inventors have observed a degradation of battery reversibility in phase 2 and phase 3 operation when battery potential is allowed to fall below about 1 volt. It is thought that this degradation may be due to decomposition of the battery electrolyte. The inventors believe that if the problem of electrolyte instability can be overcome then excellent reversibility will be observed over the entire phase 2 path and that improved reversibility may be observed in phase 3 operation.

X-ray diffraction analysis performed by the inventors reveals the phase 2 structure to be a layered compound having a crystal symmetry distinct from that exhibited by a phase 1 structure.

EXAMPLE 1

A battery was constructed as follows:

The cathode consisted of approximately 6 cm$^2$ of aluminum foil on which was deposited 3 mg/cm$^2$ of MoS$_2$. The anode was a similar sized piece of lithium foil. The electrodes were separated by a polypropylene separator soaked with an electrolyte of 0.7M LiBr in propylene carbonate (PC). The battery was discharged at 1mA through phase 1 down through a first voltage plateau of about 1.1 V until the cathode was converted to phase 2. The battery was then repeatedly charged and discharged more than one hundred times at 10 mA in phase 2 between voltages up to 2.7 V which corresponds to a fully charged phase 2 cathode and 1.0 V. Battery capacity corresponded to 1 electron per MoS$_2$ molecule ($\Delta x = 1$).

EXAMPLE 2

A battery of similar construction to the cell in Example 1 except that the cathode had only 0.3 mg/cm$^2$ of MoS$_2$ deposited on it. The cathode was converted into phase 3 by discharging the battery through both the first voltage plateau into phase 2 and through a second voltage plateau of about 0.55 V into phase 3. The discharge current was 1 mA. The battery was then repeatedly charged and discharged between 2.4 V (which corresponds to a fully charged phase 3 cathode) and 1.0 V more than one hundred times at 1 mA. Battery capacity corresponded to 1.5±0.2 electrons per MoS$_2$ molecule ($\Delta x \simeq 1.5 \pm 0.2$). The battery was repeatedly charged and discharged a few times between 2.4 V and 0.5 V. Battery capacity in this case corresponded to 2±0.2 electrons per MoS$_2$ molecule ($\Delta x \simeq 2 \pm 0.2$).

EXAMPLE 3

The battery of Example 2 was recharged slowly (at about 100 microamps) to 2.7 V. It was found that the cathode was reconverted to phase 2 operation after being recharged in this manner.

EXAMPLE 4

A battery was constructed as follows:
The cathode consisted of 1.3 cm$^2$ of aluminum foil on which was deposited 0.5 mg/cm$^2$ of MoS$_2$. The anode consisted of a similar area of lithium foil pressed onto an expanded nickel grid. The electrodes were suspended in an electrolyte of 0.7M LiBr and PC contained in a 50 ml glass beaker. An argon atmosphere was contained within the beaker with a neoprene stopper. This battery was conditioned by a 100 microamp initial discharge, then repeatedly cycled in phase 2 eighty-two times between 2.7 V and 1 V at 100 microamps. The battery was then further discharged into phase 3 where it cycled repeatedly ten times between 2.4 V and 0.5 V.

Although the initial conditioning discharges in the foregoing examples were done at room temperature (about 20° C.) and good results were achieved, it is generally considered desirable to cool a cell for the conditioning discharge. Otherwise, problems with electrolyte decomposition may be encountered. The cathodes of the above examples were relatively thin and it was possible to perform the conditioning discharges relatively quickly at room temperature without development of significant temperature gradients in the cathode. However, with thicker cathodes, the desirability of cooling becomes important. At 10 mg/cm$^2$ of MoS$_2$, it appears that cooling is essential. Although cooling temperatures as low as −20° C. have been used, a temperature of 0° C. has been found quite satisfactory for cathode thicknesses ranging up to about 20 mg/cm$^2$ of MoS$_2$.

Phase operation may also be achieved where the MoS$_2$ is partially oxidized to MoO$_2$. Partial oxidation to MoO$_2$ can improve conductivity without serious loss of capacity.

EXAMPLE 5

A battery having a cathode which included MoS$_2$ partially oxidized to MoO$_2$ was constructed as follows:

(a) MoS$_2$ powder having an average particle diameter of about 20 microns was mixed in a 1 to 1 volume ratio with propylene glycol and a film of the resulting slurry applied to the aluminum foil substrate.

(b) The substrate with applied film was baked at 580° C. in an atmosphere containing about 0.4 mole percent oxygen in nitrogen for about 10 minutes to form a cathode containing approximately 20 mole percent MoO$_2$ and approximately 80 mole percent MoS$_2$.

A cell was constructed using two stainless steel flanges separated by a neoprene O-ring sealer. The anode consisted of a 6 cm$^2$ sheet of lithium. A 6 cm$^2$ piece of the prepared cathode (on which had been deposited approximately 43 milligrams of the partially oxidized MoS$_2$) was used as the cell cathode. A porous polypropylene separator sheet which had been soaked in a 1 m solution of lithium perchlorate in propylene carbonate was inserted between the anode and the cathode.

The newly constructed cell was conditioned by initially discharging it at 4 mA to a lower cutoff voltage of about 0.85 V. During this initial discharge, the cell voltage dropped in about 20 minutes to a plateau of about 1 V and then decreased approximately linearly to about 0.85 V in a further 2 hours. The cell thus prepared and conditioned was cycled through 66 discharge-charge cycles at about 4 mA between a minimum voltage of about 0.85 V and a maximum voltage of about 2.7 V.

We claim:

1. In an electrolytic cell having a lithium anode, a non-aqueous electrolyte and a cathode, the improvement wherein said cathode comprises material having the chemical formula $$Li_xMoS_2,$$

where $0 < x \leq 3$, which cathode has been conditioned for reversible discharging operation in the cell by discharging the cell to a first cell voltage plateau, further discharging the cell on said first cell voltage plateau, and further discharging the cell to a voltage below said first cell voltage plateau but no less than about 0.6 volts.

2. The improvement of claim 1, wherein said first cell voltage plateau is at a voltage in the range of about 0.7 volts to about 1.1 volts.

3. The improvement in claim 1, wherein said first cell voltage plateau is in the range of about 0.9 volts to about 1.1 volts.

4. The improvement of claim 1, 2 or 3 wherein the cell is recharged following conditioning to a maximum voltage of about 2.7 volts.

5. The improvement of claim 1, 2 or 3, wherein said discharging is done while the cell is at a low temperature below room temperature.

6. The improvement of claim 1, 2 or 3, wherein said discharging is done at a temperature in the range of about 0° C. to about −20° C.

7. The improvement of claim 1, wherein said cathode has been further conditioned following discharging to said first cell voltage plateau by discharging the cell to a second cell voltage plateau below said first cell voltage plateau, further discharging the cell on said second voltage plateau, and further discharging the cell to a voltage below said second cell voltage plateau but no less than about 0.3 volts.

8. The improvement of claim 7, wherein said first cell voltage plateau is at a voltage in the range of about 0.7 volts to about 1.1 volts, and said second cell voltage plateau is at a voltage in the range of about 0.4 volts to about 0.6 volts.

9. The improvement of claim 7, wherein said first cell voltage plateau is at a voltage in the range of about 0.9 volts to about 1.1 volts, and said second cell voltage plateau is at a voltage in the range of about 0.45 volts to about 0.55 volts.

10. The improvement of claim 7, 8 or 9, wherein said discharging is done while the cell is at a low temperature below room temperature.

11. The improvement of claim 7, 8 or 9, wherein said discharging is done while the cell is at a temperature in the range of about 0° C. to about −20° C.

12. In an electrolytic cell having a lithium anode, a non-aqueous electrolyte and a cathode, the improvement wherein said cathode comprises a material having the chemical formula $Li_xMoS_2$, where $0 < x \leq 2$, which cathode permits reversible recycling of cell potentials between about 2.7 volts and 0.8 volts, the value of x approaching a value less than 2 and greater than 1 on discharge to cell potentials of about 0.8 volts.

13. In an electrolytic cell having a lithium anode, a non-aqueous electrolyte and a cathode, the improvement wherein said cathode comprises a material having the chemical formula $Li_xMoS_2$, where $0 < x \leq 3$, which cathode permits reversible recycling of cell potentials between about 2.4 volts and about 0.5 volts, the value of x approaching a value near or about 3 on discharge to cell potentials of about 0.5 volts.

14. The improvement of claim 1 or 12, wherein the $MoS_2$ is partially oxidized to $MoO_2$.

15. The improvement of claim 7 or 13, wherein the $MoS_2$ is partially oxidized to $MoO_2$.